Patented Aug. 17, 1943

2,326,736

UNITED STATES PATENT OFFICE 2,326,736

POLYMERIZING UNSATURATED RESINOPHORIC COMPOUNDS BY ACTION OF ULTRAVIOLET LIGHT IN CONJUNCTION WITH BETA SUBSTITUTED NAPHTHALENE DERIVATIVES

David E. Adelson, Berkeley, and Hans Dannenberg, San Francisco, Calif., assignors to Shell Development Company, San Francisco, Calif., a corporation of Delaware No Drawing. Application September 21, 1940, Serial No. 357,818

11 Claims. (Cl. 204—158)

This invention relates to a process of polymerization. More specifically, the invention is concerned with a method of polymerizing resinophoric substances in the presence of beta substituted naphthalene derivatives and actinic light.

It is an object of the present invention to provide a simple and economical process for polymerizing resinophoric compounds. Another object is to provide a method which employs as catalyst substances which have a greater solubility in the resinophoric compounds than the commonly used peroxide catalysts. A further object is to provide a process employing a catalyst of lower cost than the prevailing peroxide catalysts. A still further object resides in employing a polymerization catalyst of low water solubility which is particularly advantageous for emulsion polymerization. An additional object is provide a process which employs a catalyst which is decidedly safer to ship and handle than peroxide catalysts.

The naphthols have long been considered to be inhibitors for various polymerization reactions. There are a number of references in the technical literature suggesting the use of the naphthols for the purpose of inhibiting polymerization of various compounds and usually no discrimination has been made between alpha-naphthol and beta-naphthol for this purpose. It was, therefore, very surprising and entirely contrary to these prior teachings in the art when we discovered that beta-naphthol is an effective polymerization catalyst, instead of inhibitor, when employed in conjunction with actinic light. In this connection, beta-naphthol is substantially as effective as benzoyl peroxide, a well known and widely used polymerization catalyst. In order to test the effectiveness of beta-naphthol as compared to benzoyl peroxide the following experiments were performed. Methyl isopropenyl ketone, a compound typical of vinyl ketones which polymerizes under the action of actinic light, was used as the substance to be polymerized. This compound may be polymerized to a hard, colorless resin and the course of the polymerization reaction followed by observations of the change of refractive index of the polymerizing compound. The monomeric compound has a refractive index of about $n_D^{20}=1.423$ while when 100% polymerization has occurred the refractive index measures about $n_D^{20}=1.523$. Partially polymerized material gives a refractive index intermediate between these values and it has been found that the degree of polymerization varies linearly with the refractive index. Observation of the refractive index of the polymerizing ketone may thus be used to follow the course of the polymerization. Samples of methyl isopropenyl ketone were prepared which contained 1% benzoyl peroxide, 1% beta-naphthol or no catalyst and a sample of each of these was exposed to light from a high pressure mercury lamp while a sample of each was stored in darkness. At intervals, measurements were made of the refractive indices of the samples. Owing to the presence of the beta-naphthol or benzoyl peroxide, the freshly prepared, unpolymerized monomer had a refractive index of about $n_D^{20}=1.427$. The following tabulation of results lists the increase of refractive index as units of the fourth decimal place and shows the effectiveness of beta-naphthol as a polymerization catalyst.

| Total hours elapsed | 1% beta-naphthol | | 1% benzoyl peroxide | | No added catalyst | |
|---|---|---|---|---|---|---|
| | Darkness | Mercury light | Darkness | Mercury light | Darkness | Mercury light |
| 50 | | 53 | | 59 | | 31 |
| 69 | | 70 | | 73 | | 37 |
| 133 | | 153 | | 187 | | 90 |
| 177 | | 218 | | 170 | | 120 |
| 294 | | 583 | | ¹(930) | | 250 |
| 312 | | ¹(910) | | | 30 | |
| 341 | | | | | | 315 |
| 504 | | | | | 49 | |
| 509 | | | | | | ¹(930) |
| 624 | 92 | | 235 | | 69 | |
| 744 | 112 | | 244 | | 80 | |
| 840 | 142 | | 261 | | | |
| 912 | 156 | | 281 | | | |

¹ Sample resinified.

In view of the general teaching of the prior art that naphthols are polymerization inhibitors, it was thought that some impurity might be present in the beta-naphthol which caused it to act as a polymerization catalyst. This was found not to be the case by comparing the rate of polymerization of samples of methyl isopropenyl ketone to which had been added about 2% of ordinary commercial beta-naphthol in one instance and about 2% carefully purified beta-naphthol in another and exposing the samples to illumination from a high pressure mercury lamp. A third sample containing no catalyst was used as a control. The impure beta-naphthol was found to contain 0.04% chlorine and 0.08% sulphur. This material was purified by recrystallization from absolute alcohol, then from water, followed by drying in vacuo. This purified material was free of halogens and sulphur.

The results of the test which follow show the degree of polymerization of the samples in terms of increase of units of the fourth decimal place of the refractive indices and clearly indicate that the catalytic effect is inherent with the beta-naphthol since the purified substance was a more active catalyst than the impure beta-naphthol.

| Total hours elapsed | 2% purified beta-naphthol | 2% impure beta-naphthol | No added catalyst |
|---|---|---|---|
| 48 | 52 | 43 | 32 |
| 95 | 107 | 91 | 69 |
| 162 | 179 | 159 | 112 |
| 209 | 219 | 208 | 158 |
| 260 | 278 | 253 | 218 |
| 368 | 513 | 420 | 362 |

Beta-naphthol is an effective catalyst when used in conjunction with actinic light for other polymerizable substances such as acrylate esters, and acrylic acids. For example, beta-naphthol was tested for its ability to polymerize methyl methacrylate. The course of the polymerization was followed by determinations of the refractive index of the sample undergoing polymerization in the presence of 2% beta-naphthol and exposed to actinic rays from a high pressure mercury light. A blank was run for comparison and the following tabulates the results of time elapsed from the preparation of the samples and beginning of the polymerization with the increase in refractive index as units of the fourth decimal place:

| Total hours elapsed | 2% beta-naphthol | No added catalyst |
|---|---|---|
| 0 | 0 | 0 |
| 17 | 221 | |
| 25 | (¹) | 3 |
| 70 | | ² 7 |
| 96 | | |

¹ No further readings could be made. The material was barely flowing after 25 hours and was completely solid and resinified after 41 hours.
² The material was completely solid between 96 and 135 hours.

Styrene and related compounds may also be polymerized with actinic light in the presence of beta-naphthol. In a test with styrene, about 2% beta-naphthol was added to one portion of styrene and no catalyst added to another portion. The samples were then exposed to radiation from a high pressure mercury light and the course of polymerization followed by observation of the increase of refractive index. The results obtained are tabulated below:

| Total hours elapsed | 2% beta-naphthol | No added catalyst |
|---|---|---|
| 0 | 0 | 0 |
| 47 | 109 | 29 |
| 113 | 267 | 61 |
| 160 | 391 | 97 |

The samples resinified to solids with an increase of refraction of about 500 units.

Other beta-substituted naphthalene derivatives are also effective polymerization catalysts when employed in conjunction with actinic light. Furthermore, like beta-naphthol, some of these would be expected to behave as inhibitors rather than catalysts from prior teachings in the art. This is the case with thio-beta-naphthol. Compounds containing a mercapto group have long been taught to be polymerization inhibitors, but we have discovered that thio-beta-naphthol, quite to the contrary, is a very effective catalyst. When tested as above for its ability to polymerize methyl isopropenyl ketone in 2% concentration, the following results were obtained which indicate that it is a slightly more efficient catalyst than beta-naphthol.

| Total hours elapsed | 2% thio-beta-naphthol | No added catalyst |
|---|---|---|
| 0 | 0 | 0 |
| 65 | 99 | 51 |
| 94 | 133 | 69 |
| 163 | 195 | 112 |
| 207 | 258 | 158 |
| 259 | 308 | 218 |

Four other beta-substituted naphthalene derivatives were also tested with methyl isopropenyl ketone and found to be efficient polymerization catalyst with actinic light. These were beta-naphthonitrile, beta-naphthoic acid, 2,7-dihydroxynaphthalene (beta-beta'-dihydroxynaphthalene) and beta-naphthyl acetate and the results are tabulated below:

| Total hours elapsed | 2% beta-naphthonitrile | 2% beta-naphthoic acid | 2% 2,7-dihydroxynaphthalene | 2% beta-naphthyl acetate |
|---|---|---|---|---|
| 0 | 0 | 0 | 0 | 0 |
| 51 | 39 | 51 | 95 | 57 |
| 100 | 84 | 114 | 220 | 118 |
| 120 | 103 | 140 | 294 | 137 |
| 165 | 149 | 207 | | 190 |
| 219 | 219 | 291 | | |
| 266 | 290 | 372 | | 336 |
| 339 | 508 | | | |

These results coupled with the foregoing indicate that the most active catalyst is 2,7-dihydroxynaphthalene which contains two substituent groups in two of the beta positions in the naphthalene molecule. Also suitable as polymerization catalyst are the ethers of beta-hydroxynaphthalenes. Furthermore, it was found that naphthalenes substituted in beta position by one or more hydroxyl groups display catalytic activity in promoting the polymerization reaction in the absence of actinic light although this effect is not so pronounced as in the presence of actinic light.

In executing the process of the invention, the polymerization of the resinophoric compound or compounds is conducted in the presence of a substituted naphthalene. For this purpose it is essential that the substituents be linked to the naphthalene nucleus in the beta position and, if desired, several substituents which may be identical or different may be so linked. These beta substituted naphthalene derivatives which are polymerization catalysts with actinic light may be represented by the general formula

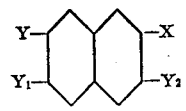

wherein X represents a radical of the group consisting of —OH, —SH, —C≡N, —COOH, —OR and —OOCR wherein R is a hydrocarbon radical and Y, Y₁ and Y₂ represent substituents from the group consisting of —H, —OH, —SH, —C≡N, —COOH, —OR and —OOCR wherein R is a hydrocarbon radical.

The concentration of catalyst employed in the process may be varied to suit circumstances depending upon the particular beta substituted naphthalene derivative employed, the particular compound to be polymerized, the rate of polymerization desired, the quality and quantity of radiation of actinic light and various other factors. In general, with other conditions the same, the higher the concentration of catalyst, the more rapid is the rate of polymerization although this effect is not nearly so marked as is the case with peroxide catalysts. Ordinarily, the catalyst is employed in concentrations of from about 0.1% to 10% of the resinophoric compound or compounds. A more preferred concentration is from about 1% to 3%.

The polymerization of the resinophoric substances in the presence of the beta substituted naphthalene derivatives is conducted in the presence of actinic light. Light derived from various sources may be used for this purpose, but ordinarily light which is rich in ultra-violet radiation is most satisfactory. Thus for this purpose there may be employed sunlight, light from electric arc lamps, so-called electric sun lamps, etc. together with the especially suitable mercury vapor lamps. Actinic light from such sources is very suitable in having radiation within the ultra-violet range of from about 136 to 4000 A.

A variety of compounds may be employed as raw materials to be polymerized by the process of the invention. One group of these is the vinyl ketones. By a vinyl ketone is meant those compounds which contain the grouping

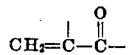

and include such compounds as methyl vinyl ketone, ethyl vinyl ketone, isopropyl vinyl ketone, phenyl vinyl ketone, divinyl ketone, methyl isopropenyl ketone, ethyl isopropenyl ketone, propyl isopropenyl ketone, secondary butyl isopropenyl ketone, phenyl isopropenyl ketone, cresyl isopropenyl ketone, diisopropenyl ketone and the like together with their homologues, analogues and substitution products. Another group of polymerizable compounds to which the process of the invention is applicable are the acroleins which contain the essential grouping

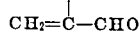

and include such compounds as acrolein, methacrolein, alpha-chloracrolein, beta-chloracrolein, ethacrolein, cinnamic aldehyde, and the like. One of the most important groups of compounds are the acrylate esters. This group embraces such compounds as methyl acrylate, ethyl acrylate, propyl acrylate, isopropyl acrylate, butyl acrylates, amyl acrylates, methyl methacrylate, ethyl methacrylate, isobutyl methacrylate and the like together with their homologues, analogues and suitable substitution products. Polymerizing acrylic acids are also contemplated according to the invention. These acids contain the essential group

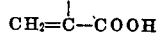

and include compounds like acrylic acid, alpha-chloracrylic acid, beta-chloracrylic acid, methacrylic acid, ethacrylic acid, cinnamic acid and the like. Also useful are the acrylonitriles which possess the grouping

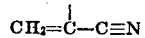

and include compounds like acrylonitrile, methacrylonitrile, alpha-chloracrylonitrile, cinnamonitrile, and the like. The styrenes are another very important group of compounds which may be polymerized by the process of the invention. Styrene is the simplest member of this group, but also included are such compounds as methyl styrene, dimethyl styrene, trimethyl styrene, isopropyl styrene, chlorostyrene, bromostyrene, indene, vinyl naphthalene, together with their homologues, analogues and substitution products. If desired, two or more substances from the same or different groups may be polymerized.

The process of the invention may be executed in any suitable manner. Articles of various shapes and sizes may be manufactured such as rods, tubes, discs, sheets, novelty articles, etc. by incorporating the polymerization catalyst in the monomeric resinophoric compound, placing the mixture in a suitably shaped mold and exposing it to actinic light whereby the compound is polymerized to a hard, useful resinous object. Ordinarily, atmospheric temperatures and pressures may be employed for this purpose, although, if desired, elevated temperatures together with, if necessary, superatmospheric pressures sufficient to maintain the reactant liquid may be employed. In general, the rate of polymerization is higher at elevated temperatures and in some cases more desirable products are obtained. This is particularly the case with methyl isopropenyl ketone which yields resins with very suitable properties when the polymerization temperature is elevated to the neighborhood of about 50° C.

Another suitable method for executing the process which is particularly suited to continuous production of polymer is to polymerize an emulsion of the resinophoric compounds. The polymerizable compounds after incorporation therein of the catalyst may be prepared into an emulsion with water with the aid of various emulsifying agents such as soaps, long chain sulphonates, gelatin, and the like and the emulsion exposed to actinic light. The method may be made continuous by flowing the emulsion along in a passage in any suitable apparatus, fresh emulsion being fed into one end of the passage and polymerized material being withdrawn at the other. The polymer obtained by this method is ordinarily in a finely divided state which is very suitable for use in molding operations. The catalyst employed in our process of polymerization is very suitable for this method of execution since it has low solubility in water and tends largely to remain with the resinophoric compound in the emulsion where it is most useful for effecting the polymerization.

We claim as our invention:

1. A process which comprises polymerizing styrene in admixture with beta-naphthol by exposure of said mixture to actinic light which is rich in ultra-violet radiation, said beta-naphthol catalytically increasing the rate of polymerization by its presence.

2. A process which comprises polymerizing a styrene in admixture with beta-naphthol by exposure of said mixture to actinic light which is rich in ultra-violet radiation, said beta-naphthol catalytically increasing the rate of polymerization by its presence.

3. A process which comprises polymerizing a styrene in admixture with a substituted naphthalene of the general formula

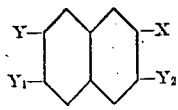

wherein X is a radical of the group consisting of —OH, —SH, —C≡N, —COOH, —OR and —OOCR (R=hydrocarbon radical), and Y, Y₁ and Y₂ are substituents of the group consisting of —H, —OH, —SH, —C≡N, —COOH, —OR and —OOCR (R=hydrocarbon radical) by exposure of said mixture to actinic light which is rich in ultra-violet radiation, said substituted naphthalene catalytically increasing the rate of polymerization by its presence.

4. A process which comprises polymerizing methyl methacrylate in admixture with beta-naphthol by exposure of said mixture to actinic light which is rich in ultra-violet radiation, said beta-naphthol catalytically increasing the rate of polymerization by its presence.

5. A process which comprises polymerizing an acrylate ester in admixture with beta-naphthol by exposure of said mixture to actinic light which is rich in ultra-violet radiation, said beta-naphthol catalytically increasing the rate of polymerization by its presence.

6. A process which comprises polymerizing an acrylate ester in admixture with a substituted naphthalene of the general formula

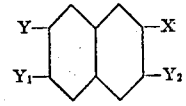

wherein X is a radical of the group consisting of —OH, —SH, —C≡N, —COOH, —OR and —OOCR (R=hydrocarbon radical), and Y, Y₁ and Y₂ are substituents of the group consisting of —H, —OH, —SH, —C≡N, —COOH, —OR and —OOCR (R=hydrocarbon radical) by exposure of said mixture to actinic light which is rich in ultra-violet radiation, said substituted naphthalene catalytically increasing the rate of polymerization by its presence.

7. A process which comprises polymerizing methyl isopropenyl ketone in admixture with beta naphthol by exposure of said mixture to actinic light which is rich in ultra-violet radiation, said beta-naphthol catalytically increasing the rate of polymerization by its presence.

8. A process which comprises polymerizing a vinyl ketone in admixture with beta naphthol by exposure of said mixture to actinic light which is rich in ultra-violet radiation, said beta-naphthol catalytically increasing the rate of polymerization by its presence.

9. A process which comprises polymerizing a vinyl ketone in admixture with a substituted naphthalene of the general formula

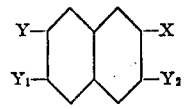

wherein X is a radical of the group consisting of —OH, —SH, —C≡N, —COOH, —OR and —OOCR (R=hydrocarbon radical), and Y, Y₁, and Y₂ are substituents of the group consisting of —H, —OH, —SH, —C≡N, —COOH, —OR and —OOCR (R=hydrocarbon radical) by exposure of said mixture to actinic light which is rich in ultra-violet radiation, said substituted naphthalene catalytically increasing the rate of polymerization by its presence.

10. A process which comprises polymerizing a resinophoric compound from the group consisting of vinyl ketones, acroleins, acrylate esters, acrylic acids, acrylonitriles and styrenes in admixture with a substituted naphthalene containing a hydroxyl group in the beta position by exposure of said mixture to actinic light which is rich in ultra-violet radiation, said substituted naphthalene catalytically increasing the rate of polymerization by its presence.

11. A process which comprises polymerizing a resinophoric compound from the group consisting of vinyl ketones, acroleins, acrylate esters, acrylic acids, acrylonitriles and styrenes in admixture with a substituted naphthalene of the general formula

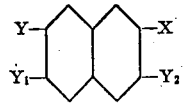

wherein X is a radical of the group consisting of —OH, —SH, —C≡N, —COOH, —OR and —OOCR (R=hydrocarbon radical), and Y, Y₁ and Y₂ are substituents of the group consisting of —H, —OH, —SH, —C≡N, —COOH, —OR and —OOCR (R=hydrocarbon radical) by exposure of said mixture to actinic light which is rich in ultra-violet radiation, said substituted naphthalene catalytically increasing the rate of polymerization by its presence.

DAVID E. ADELSON.
HANS DANNENBERG.